(12) United States Patent
Vah et al.

(10) Patent No.: US 12,061,875 B2
(45) Date of Patent: Aug. 13, 2024

(54) DETERMINING INDICATIONS OF VISUAL ABNORMALITIES IN AN UNSTRUCTURED DATA STREAM

(71) Applicant: Dell Products, L.P., Round Rock, TX (US)

(72) Inventors: Jeffrey Vah, Round Rock, TX (US); Ravi Shukla, Bangalore (IN); Aaron Sanchez, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 301 days.

(21) Appl. No.: 17/721,169

(22) Filed: Apr. 14, 2022

(65) Prior Publication Data

US 2023/0334246 A1    Oct. 19, 2023

(51) Int. Cl.
*G06F 40/20* (2020.01)
*G06F 40/289* (2020.01)
*G06Q 30/016* (2023.01)

(52) U.S. Cl.
CPC ......... *G06F 40/289* (2020.01); *G06Q 30/016* (2013.01)

(58) Field of Classification Search
CPC ............................ G06F 40/279; G06F 40/20
See application file for complete search history.

(56) References Cited

U.S. PATENT DOCUMENTS

| | | | | |
|---|---|---|---|---|
| 7,853,544 B2 * | 12/2010 | Scott | ............... | G06F 16/353 |
| | | | | 706/45 |
| 7,899,769 B2 * | 3/2011 | Jones | ............... | G06F 16/35 |
| | | | | 706/45 |
| 8,768,050 B2 * | 7/2014 | Kannan | ............... | G06F 18/285 |
| | | | | 382/161 |

(Continued)

FOREIGN PATENT DOCUMENTS

CN        109684475 B  *  3/2021   ............. G06N 3/084

OTHER PUBLICATIONS

"BART (large-sized model)" [https://huggingface.co/facebook/bart-large] retrieved Apr. 8, 2024, 4 pages.

(Continued)

*Primary Examiner* — Daniel Abebe
(74) *Attorney, Agent, or Firm* — Amin, Turocy & Watson, LLP

(57) ABSTRACT

A corpus of textual data records, labeled by experts as corresponding to a defined characteristic, that comprise descriptions of problems with an item are collected. A language model generates a plurality of n-grams from the corpus. Frequently occurring n-grams are analyzed using a zero-shot learning model to determine similarity to the defined characteristic. N-grams highly similar to the defined characteristic may be selected as defined phrases. N-grams highly similar to another characteristic may also be selected to reduce false positives. The zero-shot model may also be used to determine a weighting factor for each defined phrase for each record. A relevance score is determined for a record (Continued)

by multiplying the weighting factors for each phrase that has a similarity score relative to the record above a threshold based on the expert labeling. The relevancy score may be used to automatically diagnose problems with the item.

20 Claims, 11 Drawing Sheets

(56) References Cited

U.S. PATENT DOCUMENTS

| | | | | |
|---|---|---|---|---|
| 9,009,256 | B1* | 4/2015 | DeMorrow | G06Q 30/016 709/217 |
| 10,592,480 | B1* | 3/2020 | Joshi | G06F 16/21 |
| 10,692,016 | B2* | 6/2020 | Chandramouli | G06N 20/00 |
| 10,705,903 | B2 | 7/2020 | Majumder et al. | |
| 2021/0157716 | A1* | 5/2021 | Allen | G06F 11/3688 |
| 2021/0304747 | A1* | 9/2021 | Haas | G06Q 30/016 |

OTHER PUBLICATIONS

Lewis, et al. "BART: Denoising Sequence-to-Sequence Pre-training for Natural Language Generation, Translation, and Comprehension" arXiv:1910.13461, Oct. 29, 2019, 10 pages.

"Bart-large-mnli" [https://huggingface.co/facebook/bart-large-mnli] retrieved Apr. 8, 2024, 5 pages.

* cited by examiner

| REC | MESSAGES | Z-SCORE |
|---|---|---|
| 16A | MESSAGE A | > |
| 16B | MESSAGE B | < |
| ⋮ | ⋮ | |
| 16n | MESSAGE n | > |

FIG. 5

```
┌─────────────────────────────────────────────────────────┐
│  A method embodiment comprises receiving, by a system   │
│  comprising a processor, an electronic current message  │
│  that comprises textual information                     │
└─────────────────────────────────────────────────────────┘
                            │
                            ▼                          905
┌─────────────────────────────────────────────────────────┐
│  Analyzing the textual information in the electronic    │
│  current message to produce, without human intervention,│
│  one or more current similarity scores that correspond  │
│  to respective one or more defined phrases, wherein at  │
│  least one of the one or more defined phrases relates   │
│  to a first defined characteristics, and wherein the    │
│  one or more defined phrases are associated with        │
│  respective one or more weighting factors               │
└─────────────────────────────────────────────────────────┘
                            │
                            ▼                          910
┌─────────────────────────────────────────────────────────┐
│  In response to a current similarity score of the one   │
│  or more defined phrases being determined to satisfy a  │
│  defined similarity threshold, the embodiment may       │
│  comprise determining a defined phrase of the one or    │
│  more defined phrases as corresponding to the textual   │
│  information                                            │
└─────────────────────────────────────────────────────────┘
                            │
                            ▼                          915
┌─────────────────────────────────────────────────────────┐
│  determining a relevance score comprising combining the │
│  one or more current similarity scores and the          │
│  respective one or more weighting factors for any of    │
│  the respective one or more defined phrases for which a │
│  respective current similarity score satisfies the      │
│  defined similarity threshold                           │
└─────────────────────────────────────────────────────────┘
                            │
                            ▼                          920
┌─────────────────────────────────────────────────────────┐
│  comparing the relevance score to a defined relevance   │
│  score threshold that corresponds to the first defined  │
│  characteristic                                         │
└─────────────────────────────────────────────────────────┘
                            │
                            ▼                          925
┌─────────────────────────────────────────────────────────┐
│  in response to the relevance score being determined to │
│  exceed the defined relevance score threshold based on  │
│  a result of the comparing, determining that at least   │
│  some of the textual information of the electronic      │
│  current message describes the first defined            │
│  characteristic                                         │
└─────────────────────────────────────────────────────────┘
                                                       930
```

FIG. 9       900

```
                    ┌─────────────────────────┐
                    │  CONTINUED FROM STEP    │
                    │         1035            │
                    └────────────┬────────────┘
                                 ▼
```

In response to the one or more second high similarity defined characteristic phrases being determined to comprise second similar terms, and the combining comprising excising the second similar terms from the one or more second high similarity defined characteristic phrases and maintaining second unsimilar terms of the one or more second high similarity defined characteristic phrases, other than the second similar terms, in the consolidated second high similarity defined characteristic phrases

1040

Associating respective first weighting factors with the consolidated first high similarity defined characteristic phrases or second weighting factors with the second high similarity defined characteristic phrases based on a first count of messages of the corpus of prior electronic message data that contain the consolidated first or second defined characteristic phrases that meet a similarity criterion as determined by the learning model and based on a second count of the first count of messages that have been previously determined to relate to the first defined characteristic, wherein

1045

At least one of the consolidated first high similarity defined characteristic phrases or the second high similarity defined characteristic phrases is used to

1050

Analyze textual information in a received electronic current message to produce, without human intervention, current similarity scores that correspond to the one or more of the consolidated first defined characteristic phrases or the second defined characteristic phrases

1055

Based on the current similarity scores being determined to satisfy a similarity threshold, determine that the consolidated first defined characteristic phrases or the second defined characteristic phrases correspond to the textual information

1060

Based on the consolidated first defined characteristic phrases or the second defined characteristic phrases having been determined to correspond to the textual information, combine the current similarity scores and the respective first weighting factors for the consolidated first highly similar defined characteristic phrase or the respective second weighting factors for the consolidated second highly similar defined characteristic phrase, to produce a relevance score

1065

Based on a result of comparing the relevance score to a relevance score threshold that corresponds to the first defined characteristic indicating that the relevance score exceeds the relevance score threshold, deem the received electronic current message as containing textual information that indicates the first defined characteristic

DETERMINING INDICATIONS OF VISUAL ABNORMALITIES IN AN UNSTRUCTURED DATA STREAM

BACKGROUND

In text mining applications operating on data streams of human language, for example, customer call logs or customer surveys, etc., variations in language, tone, and word choices may exist, especially when words and text of the data streams are attempts by humans to describe visually observable mechanical defects, damage, breakage, or other physical maladies of a physical item, such as for example, a computer device such as a laptop computer, a computer screen, a smartphone. Similar variations in descriptions may occur when describing problems related to other items or products, such as automobiles, appliances, or other similarly complex items that may be difficult for lay people to understand the inner workings of and to diagnose when a problem arises therewith. Such variations typically result in reduced accuracy, including false positives, in determining a problem and its cause when analyzing language data streams, which comprise textual information that corresponds to a human trying to describe the problem, using natural language ("NLP") techniques such as, for example, Bag of Words, Topic Model, Stemming, Long Short-Term Memory model ("LSTM"), etc. to identify visually observable maladies from the language or other textual information (such as ordering of words and the number of times a word is used) in the data streams.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a consolidated form as a prelude to the more detailed description that is presented later.

Some embodiments disclosed herein may minimize the effect of content variation, for example variations in language, tone, word choices, word ordering, and the like, within a data stream using a pre-trained learning model, for example, a zero-shot model, to identify and quantify distinguishable characteristics representing visual observations (e.g., damage, fraud, or abnormalities). Embodiments may identify one or more target characteristics (which may be referred to herein as one or more defined characteristics) of a given data stream, or message that comprises textual information, by providing similarity scores of pre-defined label sets called "ZS phrases," which may be generated using n-grams analysis of a given data stream. ZS phrases may be referred to as defined phrases, defined characteristic phrases, or high similarity defined characteristic phrases, consolidated defined phrases, consolidated defined characteristic phrases, or consolidated high similarity defined characteristic phrases. Terminology used to refer to a ZS phrase may be based on what level of processing may have been performed on a ZS phrase. However, different terminology used to refer to a ZS phrase may not necessarily imply a certain level of processing of a ZS phrase or may not necessarily be intended to indicate a distinction between different levels of processing of a ZS phrase.

High similarity defined characteristic phrases, or ZS phrases, may be weighted using weighting factors that correspond to correlation between ZS Phrases and a target characteristic. A weighting factor for a given ZS phrase and is similarity, in terms of a similarity score, may be multiplied together and the product of said multiplication for each ZS phrase that has a similarity score indicating relevance to text in a given data stream by meeting a determined, or predetermined, criterion, such as exceeding a threshold, may be summed together to generate a ZS Phrase relevance score for the given data stream/message text. In an embodiment, the higher the relevance score the higher the chances of the given data stream/message text showing determined targeted characteristics and a low chance of false positives.

A ZS Phrase relevance score may be compared against a pre-defined (may referred to herein as defined) threshold to indicate with a high likelihood that the given data stream/message comprises textual information that indicates, refers to, or corresponds to, a target defined characteristics (e.g., damage, fraud, abnormalities, etc. of an item such as a computer laptop, smartphone, or table).

Reducing content variation may improve on a natural language processing model ("NLP") in detection of non-functional and/or cosmetic issues (e.g., damaged parts). Test data shows accuracy increases from 82% to 90% using embodiments disclosed herein compared to a deep-learning-based detection model (i.e., an LSTM model). Such a gain in accuracy facilitates, for example, advance parts dispatch processing to autonomously provide a higher volume of high confidence commodity predictions that heretofore typically require a visual mechanical inspection when items, such as laptop computers, smartphone, tablets, desktop computer central processing units ("CPU"), monitor displays, computer server components, and the like, are sent to a repair center for service. A higher volume of autonomous commodity recommendations reduces costs of servicing items and systems, reducing triage/diagnosis time, and may eliminate long lead time in parts order processing relative to receiving an item at a service center for repair. Increasing accuracy of predicting a determined characteristic, for example, physical damage to an item that is visually discernable, may facilitate determining/diagnosing the existence of a determined target characteristic, such as damage to an item, and ordering parts that will likely be necessary for repairing the item before the item arrives at a repair/service center.

Using a pretrained learning model, such as a zero-shot model, provides a benefit of not requiring machine learning ("ML") training data or manual label training data because a zero-shot model typically has already been pretrained. An example of a zero-shot model is a Bart-Large that is pre-trained on the MultiNLI data set. "The Multi-Genre Natural Language Inference (MultiNLI) corpus is a crowd-sourced collection of 433k sentence pairs annotated with textual entailment information. The corpus is modeled on the SNLI corpus but differs in that it covers a range of genres of spoken and written text, and supports a distinctive cross-genre generalization evaluation" as discussed at https://huggingface.co/facebook/bart-large and https://huggingface.co/Datasets/Multi_NLI).

An example embodiment method may comprise receiving, by a system comprising a processor, an electronic current message that comprises textual information. The receiving may comprise receiving an incoming message from a user or receiving may comprise receiving a record message retrieved from a corpus data structure, such as a corpus of a plurality of message logs, or records, that correspond to messages requesting diagnosis or repair of an item. The corpus may be stored in a database. The term 'current' may relate to the nature of a record being operated on, analyzed, evaluated, or otherwise being processed. A current record, message, or message log, may be an incoming message being currently received by a centralized repair computer system or may be a current record, or a plurality, or corpus, of already-stored records that is/are currently being processed. The embodiment may comprise analyzing the textual information in the electronic current message to produce, without human intervention, one or more current similarity scores that correspond to respective one or more defined phrases, wherein at least one of the one or more defined phrases relates to a first defined characteristic, and wherein the one or more defined phrases are associated with respective one or more weighting factors. The defined phrases may be, or may correspond to, high similarity defined characteristic phrases or consolidated first high similarity defined characteristic phrase. In an aspect, in response to a current similarity score of the one or more defined phrases being determined to satisfy a defined similarity threshold, determining a defined phrase of the one or more defined phrases as corresponding to the textual information. A relevance score may be determined that comprises combining the one or more current similarity scores and the respective one or more weighting factors for any of the respective one or more defined phrases for which a respective current similarity score satisfies the defined similarity threshold. The relevance score may be compared to a defined relevance score threshold that corresponds to the first defined characteristic and in response to the relevance score being determined to exceed the defined relevance score threshold based on a result of the comparing, determining that at least some of the textual information of the electronic current message describes the first defined characteristic.

In an example embodiment, at least one of the one or more defined phrases relates to a second defined characteristic that is different from the first defined characteristic. For example, the first defined characteristic may relate to visually discernable damage to an item and the second defined characteristic may relate to a functional issue with an item. A functional issue may manifest as an operational problem with the item without any visually discernable damage existing with the item.

In an example embodiment, the analyzing of the textual information in the electronic current message may be performed according to a zero-shot learning model.

In an embodiment a phrase may be determined to be one of the one or more defined phrases based on a prior similarity score being associated with the phrase before the receiving, or processing, of the electronic current message. The prior similarity score may be determined from, or with respect to, one or more electronic prior messages that have been deemed by human intervention to contain textual information that pertains to the first defined characteristic. Prior messages may be part of a corpus of messages that have been received and stored.

In an embodiment, the first defined characteristic pertains to visually perceptible physical damage that is able to occur to an item, wherein the second defined characteristic pertains to a functionality problem that is able to occur with the item, and wherein the textual information of the electronic current message comprises a customer complaint corresponding to an item.

In an embodiment the textual information of the electronic current message, or other messages of a corpus of already received message, may comprise a customer complaint related to an item associated with a customer identity of a customer, and may further comprise: directing, via an electronic authorization message without human intervention during an online electronic communication message, a communication to a device associated with the customer identity of the customer to provide the item, to which the customer complaint corresponds, to a repair facility specified in the electronic authorization message that is equipped to repair items that exhibit the first defined characteristic. The electronic authorization message may be a live voice call, a text message during a live text, or SMS, session, or other a message on another similar messaging platform.

In an embodiment, the electronic current message may be one of a plurality, or corpus, of electronic messages from which a determination of the one or more defined phrases that relate to the first defined characteristic or second defined characteristic and the respective one or more weighting factors that correspond thereto is made, or was made.

In another exemplary embodiment, a system may comprise: a processor, coupled to a memory storing instructions, that, in response to execution, cause the system to: receive an electronic current message that comprises textual information. The electronic current message may be an incoming message that is received during a live customer service session, or the electronic current message may be a message retrieved from a corpus, which may be a plurality) of previously received and stored electronic messages. The system may be caused to analyze the textual information in the electronic current message to produce, without human intervention, one or more current similarity scores that correspond to respective one or more defined phrases, wherein at least one of the one or more defined phrases relates to a first defined characteristic, and wherein the one or more defined phrases are associated with respective one or more weighting factors, the determination of which is described elsewhere herein.

The system may be caused to determine the one or more defined phrases as corresponding to the textual information responsive to the one or more current similarity scores of the one or more defined phrases being determined to satisfy a specified similarity threshold; combine the one or more current similarity scores and the respective one or more weighting factors for which the one or more current similarity scores were determined to satisfy the specified similarity threshold to produce a relevance score; compare the relevance score to a specified relevance score threshold that corresponds to the first defined characteristic, resulting in a comparison result; and categorize the textual information of the electronic current message as comprising information that has the first defined characteristic in response to the comparison result indicating that the relevance score exceeds the specified relevance score threshold.

In an embodiment, at least one of the one or more defined phrases relates to a second defined characteristic that is different from the first defined characteristic.

In an embodiment, the analyzing of the textual information in the electronic current message is performed according to a zero-shot model.

In an embodiment, a phrase is determined to be a defined phrase of the one or more defined phrases based on a prior similarity score being associated with the defined phrase before the receiving, or retrieving for processing, of the electronic current message. The prior similarity score may be determined from a group of electronic prior messages, or previously stored messages, which may be referred to as an original corpus or as an updated corpus, that have been deemed by human intervention to contain the information that pertains to the first characteristic.

In an embodiment, the first defined characteristic may pertain to visually perceptible physical damage to an item, wherein the second defined characteristic may pertain to a functionality of the item, and wherein the electronic current message comprises a customer complaint regarding the item.

In yet another exemplary method embodiment, a method comprises: using a language model, analyzing a corpus of prior electronic message data comprising messages, the analyzing resulting in analyzed corpus data. In response to determining, based on a first output from the language model, which first output may comprise n-grams, that one or more phrases, which may be n-grams, relating to a first defined characteristic occur at least as often as a first determined frequency threshold, determining—one or more first defined characteristic phrases from the analyzed corpus data that relate to the first defined characteristic. The one or more first defined characteristic phrases may comprise n-grams or parts of n-grams, or may correspond to n-grams, that result from analyzing the corpus of previously stored messages, or message records, which may be referred to as logs, and that occur more than a predetermined number of times. In response to determining, based on a second output from the language model, that one or more phrases relating to a second defined characteristic occur at least as often as a second determined frequency threshold, determining one or more second defined characteristic phrases from the analyzed corpus data that relate to the second defined characteristic. The first defined characteristic may relate to visually discernable damage to an item and the second defined characteristic may relate to functionality issues with the item.

In response to determining, based on a first output from a learning model, such as a zero-shot model, that the one or more first defined characteristic phrases have a first similarity score corresponding to the defined first characteristic above a determined first similarity threshold, determining one or more first high similarity defined characteristic phrases.

In response to determining, based on a second output from the learning model, that the one or more second defined characteristic phrases have a second similarity score corresponding to the defined second characteristic above a determined second similarity threshold, determining one or more second high similarity defined characteristic phrases.

The example embodiment method may comprise combining first terms from the one or more first high similarity defined characteristic phrases into corresponding one or more consolidated first high similarity defined characteristic phrases or second terms from the one or more second high similarity defined characteristic phrases into corresponding one or more consolidated second high similarity defined characteristic phrases. The combining may comprise: in response to the one or more first high similarity defined characteristic phrases being determined to comprise a first similar term, or terms (e.g., "laptop"), and the combining comprising excising the first similar terms from the one or more first high similarity defined characteristic phrases and maintaining first unsimilar terms of the one or more first defined characteristic phrases, other than the first similar terms, in the consolidated first high similarity defined characteristic phrases, or in response to the one or more second high similarity defined characteristic phrases being determined to comprise second similar terms, and the combining comprising excising the second similar terms from the one or more second high similarity defined characteristic phrases and maintaining second unsimilar terms of the one or more second high similarity defined characteristic phrases, other than the second similar terms, in the consolidated second high similarity defined characteristic phrase.

The example embodiment method may comprise associating respective first weighting factors with the consolidated first high similarity defined characteristic phrases or second weighting factors with the second high similarity defined characteristic phrases based on a first count of messages of the corpus of prior electronic message data that contain the consolidated first or second defined characteristic phrases that meet a similarity criterion as determined by the learning model and based on a second count of the first count of messages that have been previously determined to relate to the first defined characteristic. The embodiment may comprise at least one of the consolidated first high similarity defined characteristic phrases or the second high similarity defined characteristic phrases being used to: analyze textual information in a received, or retrieved, electronic current message to produce, without human intervention, current similarity scores that correspond to the one or more of the consolidated first defined characteristic phrases or the second defined characteristic phrases; based on the current similarity scores being determined to satisfy a similarity threshold, determine that the consolidated first defined characteristic phrases or the second defined characteristic phrases correspond to the textual information; based on the consolidated first defined characteristic phrases or the second defined characteristic phrases having been determined to correspond to the textual information, combine the current similarity scores and the respective first weighting factors for the consolidated first highly similar defined characteristic phrase or the respective second weighting factors for the consolidated second highly similar defined characteristic phrase, to produce a relevance score; and based on a result of comparing the relevance score to a relevance score threshold that corresponds to the first defined characteristic indicating that the relevance score exceeds the relevance score threshold, deem the received electronic current message as containing textual information that indicates the first defined characteristic.

A given weighting factor for a consolidated first or second determined characteristic phrase may be based on the second count of messages divided by the first count of messages.

The relevance score may be based on a summation of respective products of the current similarity scores and the respective first weighting factors or second weighting factors having a current similarity score of the one or more defined phrases that meet the determined similarity threshold.

The language model may be an n-gram model that produces n-grams as an output and the learning model may be a zero-shot learning model.

In an embodiment, the received electronic current message may be a message of the corpus of prior electronic message data. The term receiving may refer to the receiving by a computing device or system that is implementing the embodiment method of a record that is retrieved by the computing device or system from the corpus.

In an embodiment of the exemplary embodiment method, the method may be performed multiple times, wherein a first of the multiple times the corpus is an original corpus of prior electronic message data messages and wherein one or more subsequent times of the multiple times subsequent to the first time the corpus is changed, or updated, to subsequent corpus of prior electronic message data messages that comprise the original corpus of prior electronic message data message.

BRIEF DESCRIPTION OF THE DRAWINGS

FIG. 5 illustrates a table embodiment showing relevance scores associated with message.

FIG. 9 illustrates a method embodiment to determine defined characteristic phrases.

FIG. 10B is a continuation of FIG. 10A and illustrates a method embodiment to calculate and apply relevance scores.

DETAILED DESCRIPTION

Figure 1:
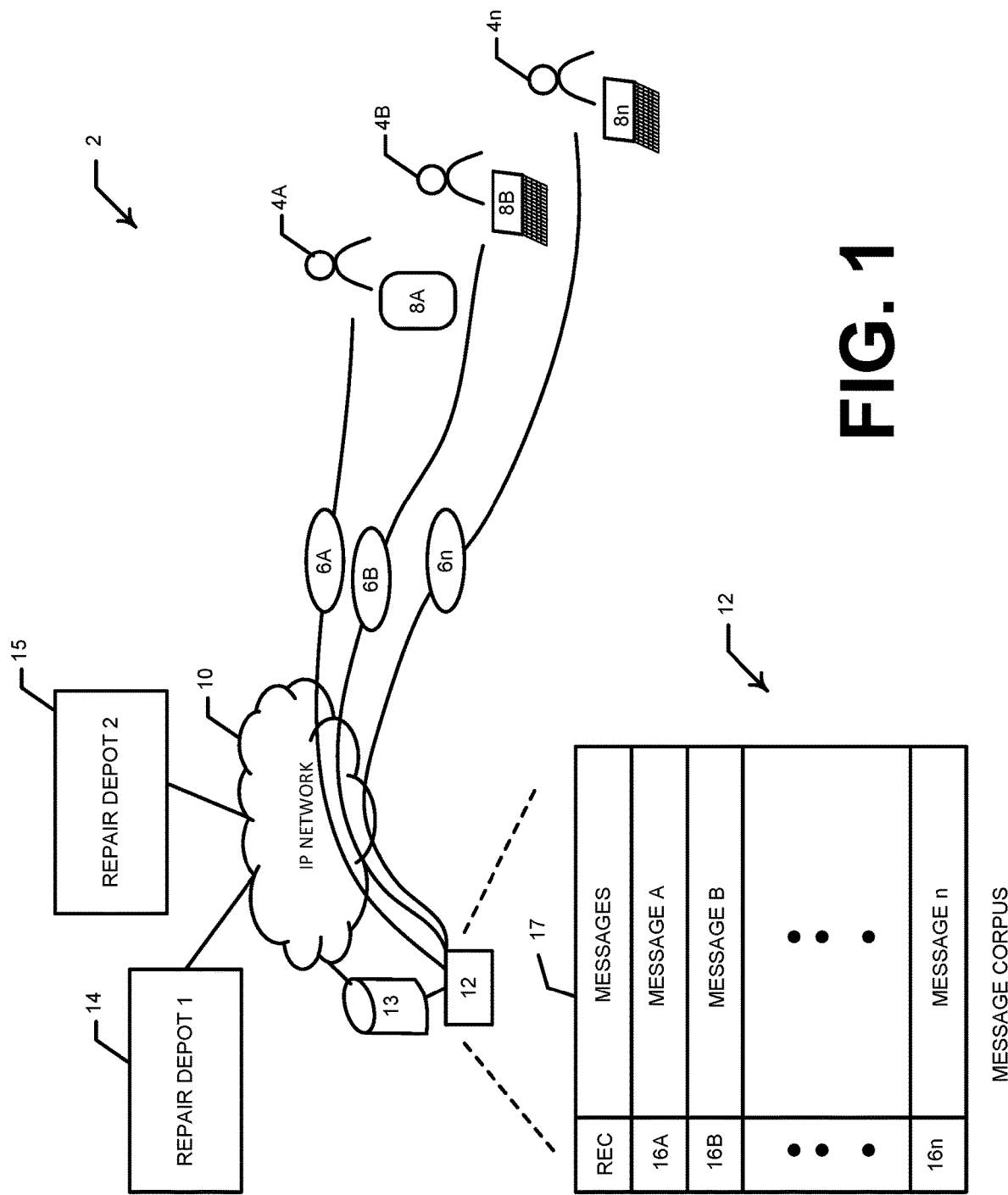
FIG. 1 illustrates a system embodiment to report problems with items.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is only illustrative and exemplary of one or more concepts expressed by the various embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to FIG. 1, the figure illustrates a system 2, that facilitates users 4A-4n in providing messages 6A-6n regarding user devices 8A-8n via a communication network 10 to a repair application that may include in item repair message database 12 that is hosted by the repair repository 13, which may be a cloud-based computer server. The messages 6 may relate to damage to items 8 that may need repair at a first repair depot 14 or possibly at a different repair depot, such as second repair depot 15. Repair message database table 12 may contain a plurality of textual message, or records of textual information, that correspond to a plurality of messages 6 sent from a corresponding plurality of user 4 regarding their respective devices 8. It will be appreciated that a given user 4 may submit more than one message 6 regarding one of his, or her, broken, or malfunctioning, devices 8. Thus, there may not necessarily be the same number of records 16 in table 12 as there are users 4 who have submitted textual repair inquiries or requests. In table 12 textual messages are shown as messages 17. The figure shows 1-n number of records 16A-16n of 1-n number of messages 17A-17n stored in table 12, which message records may correspond to users 4A-4n who may have sent messages 6A-6n, which may correspond to records 16A-16n and respective messages 17A-17n.

Figure 2:
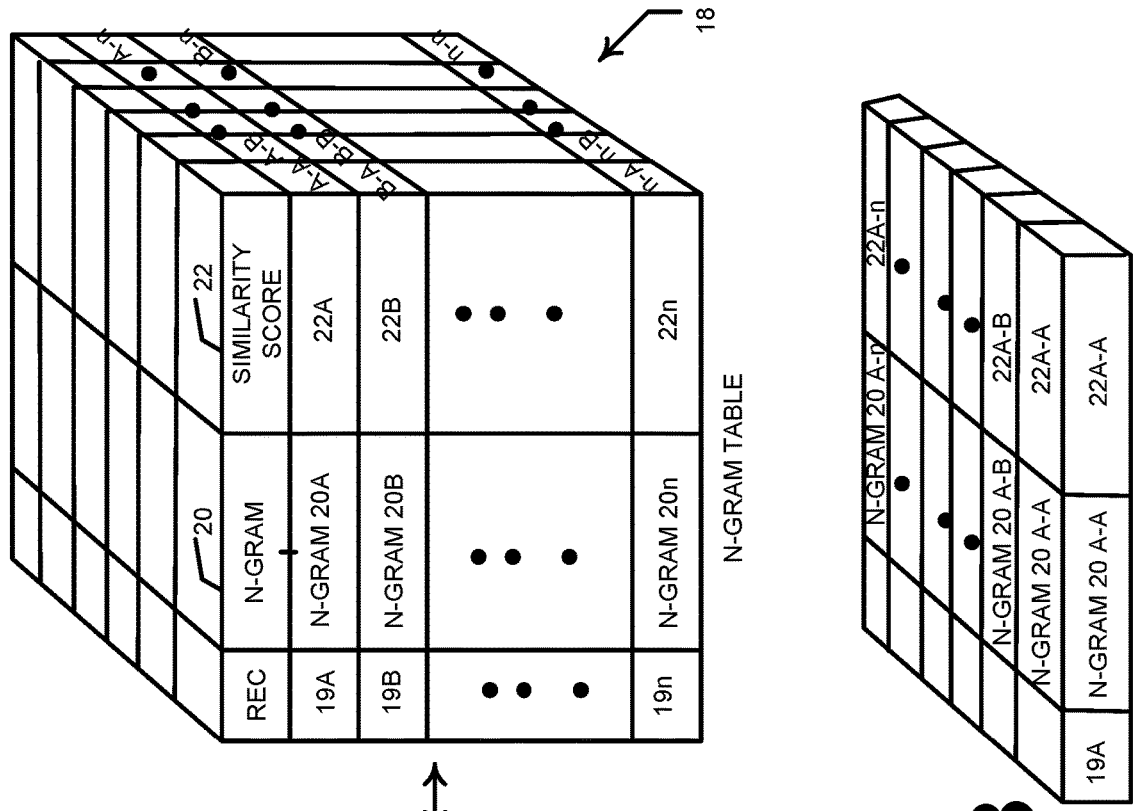
FIG. 2A illustrates a database embodiment of determined characteristic phrases.
FIG. 2B illustrates a slice of a database embodiment of determined characteristic phrases.

Turning now to FIG. 2, the figure illustrates an n-gram database 18 of n-grams and associated weighting factors. It will be appreciated that an n-gram may comprise a contiguous sequence of n items from a sequence of words. N-gram database 18, which may be referred to as a table, corresponds to table 12 insofar as records 16A-16n may correspond to respective records 19A-19n. In an embodiment similarity scores 22 of corresponding n-grams 20 may be determined from comparing the n-grams determined from records of corpus 12 to a characteristic test phrase, and the similarity scores 22 may be associated with each n-gram of each of records 19 in table 18. Each record 19A-19n may comprise, or be associated with, a plurality of corresponding n-grams 20A-20n.

Turning to FIG. 2A, the figure shows a slice of table 18 of FIG. 2 that corresponds to record 18A, which may correspond to message 17A and record 16A in table 12. In the slice of table 18 shown in FIG. 2A, record 19A is associated with n-grams 20AA-20An, which may be associated with respective similarity scores 22AA-22An.

Figure 3:
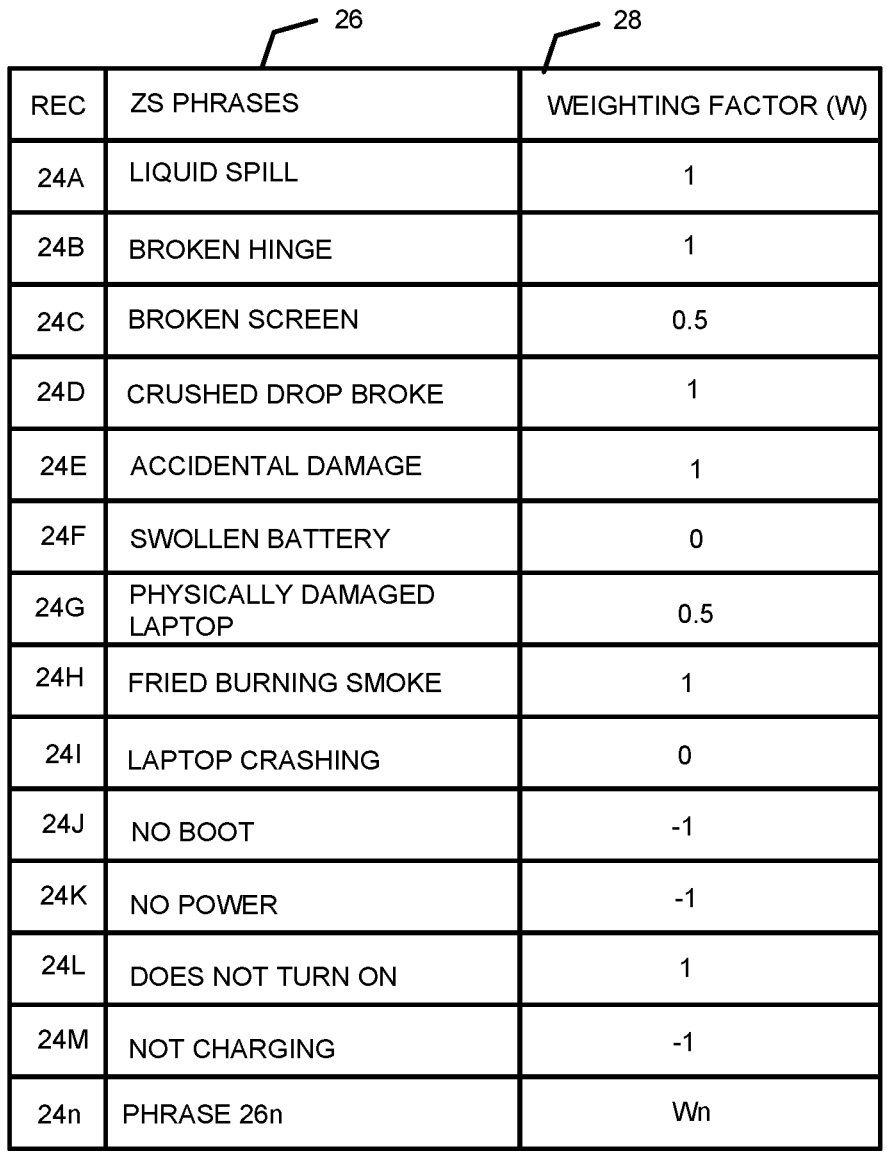
FIG. 3 illustrates a table embodiment showing determined characteristic phrases associated.

Turning now to FIG. 3, the figure illustrates a determined phrases table 24 having records 24A-24n. The number n of records 24A-24n corresponds to a number n of determined n-grams 20 shown in FIG. 2 that have a higher similarity score 22 than a predetermined threshold, for example 0.7. Table 24 shows n phrases 26A-26n, which may be consolidated phrases as discussed herein. Phrases 26 may correspond to phrases 20 shown in FIG. 2 that have a higher similarity score 22 that a predetermined threshold, for example 0.7.

In an embodiment, textual information in each of messages 17 shown in FIG. 1 may be analyzed according to a language model to determine a plurality of n-grams. The n-grams may be bigrams, trigrams, or other number n grams, and may be generated with the language model until 4 or 5 grams (or other number) from the sample data set of messages 17 in table 12 containing terms related to a targeted characteristic, for example visually discernable damage to a consumer item such as a laptop computer device, have been generated and determined.

Each of the n-grams 20 may be analyzed with a learning model, such as a zero-shot model, that may determine a semantic similarity score 22 of each n-gram relative to the determined, or predetermined, target characteristic, as described in reference to FIG. 2. The semantic similarity may be determined by comparing, with the learning model, the n-grams to a characteristic test phrase. Similarity scores may be values from 0.000 to 1.000, for example. Other formats, precision, or representations than values in the range 0.000 to 1.000 may be used for similarity scores. A similarity threshold may be set to 0.7, for example, such that n-grams having zero-shot learning model semantic similarity output scores less than 0.7 may be eliminated, or 'thrown out', from further consideration.

After n-grams having a higher similarity to the target characteristic described in the characteristic test phrase than the predetermined criteria/threshold are retained by eliminating those with a similarity score less than the predetermined criteria/threshold, remaining n-grams may be consolidated by eliminating similar or common terms, such as 'laptop' or 'phone' or other words such as prepositions and articles, with the intention of leaving descriptive terms. For example, phrases like "dropped laptop", "crushed laptop", "broken laptop cover" may be consolidated, or reduced, to "dropped", "crush", "broke", respectively. Furthermore, terms "dropped", "crush", "broke" may be combined to further consolidate them into a single phrase "dropped crush broke."

Consolidated determined characteristic phrases 26, or consolidated ZS Phrases, may include both functional and nonfunctional (physical damage) issues. In other words, consolidated determined characteristic phrases 26 may relate to a first characteristic, such as the target characteristic of visually discernable damage, or may relate to a second characteristic, such as functionality issues. The characteristics may be applied by a zero-shot learning classification task. Considering functional phrases (i.e., second characteristic) as well as nonfunctional issue phrases (i.e., first, primary, or target characteristic) helps avoid false positives (i.e., wrongly identifying functional issues as a damage issues) when relevancy scores are considered, as discussed elsewhere herein.

For purposes of providing a nonlimiting description of an embodiment, the following example is provided. Given as examples, thirteen consolidated ZS phrases 26 may be determined as described above and as shown in FIG. 3 that corresponds to n-grams 20 in FIG. 2 having a higher similarity score 22 than a predetermined threshold. The phrases 26 my comprise: 'liquid spill', 'broken hinge', 'broken screen', 'dropped crush broke', 'accidental damage', 'swollen battery', "physically damaged laptop", "fried burning smoke", "laptop crashing", "no boot", "no power", "does not turn on", "not charging". For each of the ZS phrases 26 a weighting factor 28 may be assigned and calculated as follows:

a. for a sample set of logs, such as records 17, which may be pre-labelled by experts, a similarity score of a determined characteristic phrase 26, which may be referred to as a ZS phrase, (p) is calculated for each log/record 17 using a zero-shot learning model. It will be appreciated that in an embodiment the similarity score used to calculate weighting factors 28 for a defined characteristic phrase 26 may be a different similarity score than similarity scores 22 described in reference to FIG. 2. In another embodiment, the similarity score used to calculate weighting factors 28 may be the same similarity scores 22 used as described in reference to FIG. 2.

b. if a ZS phrase 26 (p) is similar to (x) number of log records 17, according to the zero-shot learning model, above a predefined threshold (>0.95 for example) and out of (x) only (y) logs relate to actual cases of physical damage, as determined by the corresponding labels assigned to the log records by human experts, then c. a raw weighting factor of a phrase may then be determined as p=(y/x). The resultant raw weighting factor (p) may then be rounded off to weighting factors/values 28 according to the following logic:
  i. if raw weighting factor>0.7 then weighting factor=1;
  ii. if 0.2<raw weighting factor<0.7 then weighting factor=0.5;
  iii. if 0.1<raw weighting factor<0.2 then weighting factor=0; and
  iv. if raw weighting factor<0.1 then weighting factor=−1

Using the example ZS phrases 26 given above, the following weighting factors 28 may be calculated and assigned to each phrase: 'liquid spill':1, 'broken hinge':1, 'broken screen':0.5, 'crushed drop broke':1, 'accidental damage':1, 'swollen battery':0, "physically damaged laptop":0.5, "fried burning smoke":1, "laptop crashing":0, "no boot":−1, "no power":−1, "does not turn on":−1, "not charging":−1, as shown in FIG. 3. In the example, the weighting factor 28 for "liquid spill" of 1 strongly indicates a damage case while "physically damaged laptop" indicates a slightly weak phrase which may or may not include non-functional issues, hence a corresponding weighting factor 28 of 0.5. Calculating and assigning weighting factors 28 may be a one-time exercise for a given data set, such as messages 17A-17n shown in table 12 of FIG. 1. Weighting factors may be calculated again when a new corpus of messages 17 is obtained such as, for example, after new messages 17 have been appended to a previous corpus of message as described herein in reference to FIG. 8. Continuing with description of FIG. 3, in an embodiment, weighting factors 28 may be between −1 and 1. A weighting factor may be represented or referred to as 'W'.

Figure 4:
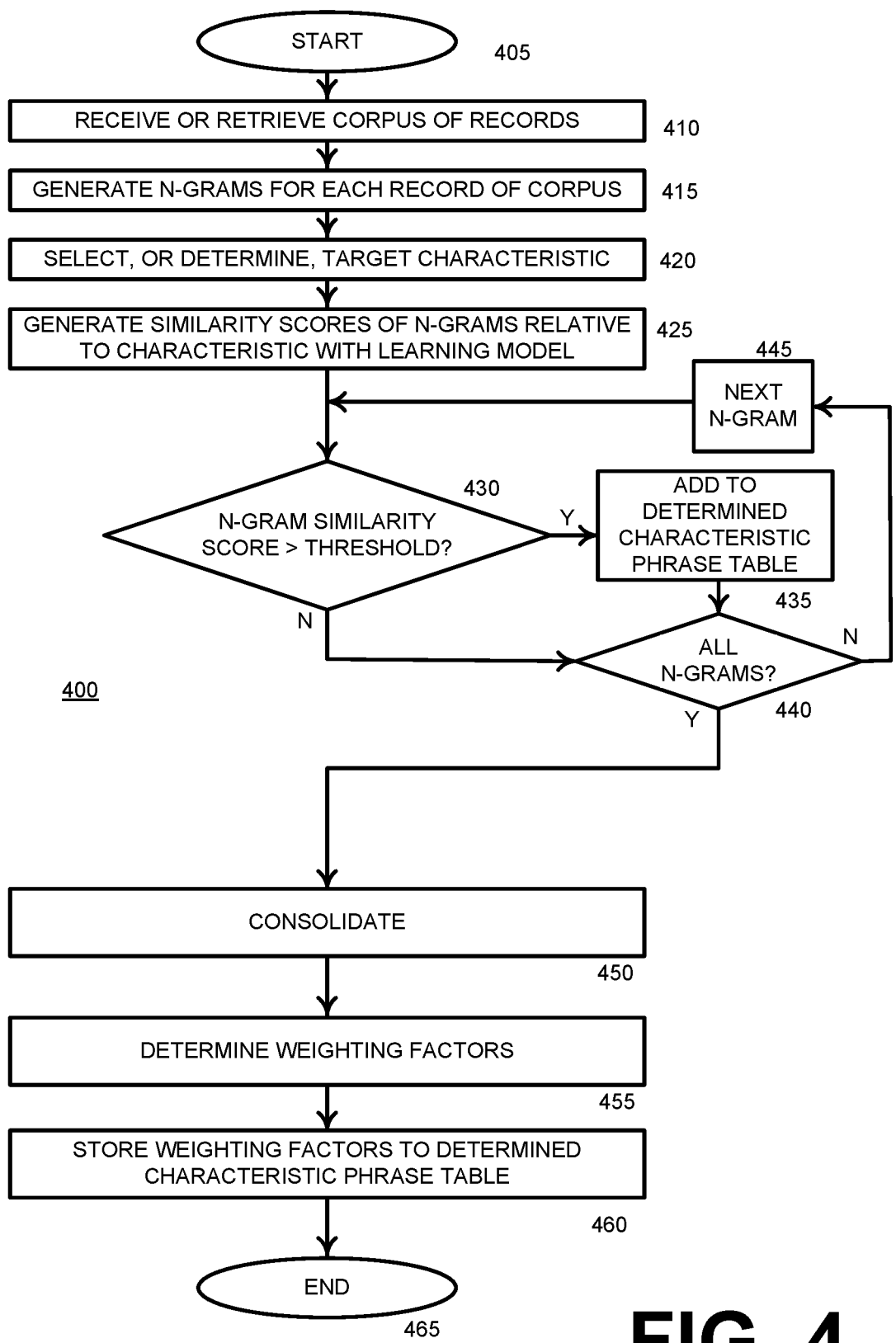
FIG. 4 illustrates a flow diagram of a method embodiment to determine characteristic phrases.

Turning now to FIG. 4, the figure illustrates a flow diagram of a method 400 to determine characteristic phrases, such as ZS phrases 26A-26n shown in FIG. 3. Method 400 begins at step 405. At step 410 a server, such as server 13 shown in FIG. 1, may receive messages 6 as shown in FIG. 1 and store them as records 17A-17n. The server may be operated by or for, or accessible by or for, a service center/depot that may receive messages 6 from customers experiencing problems with items 8, such as, for example, computing devices, appliances, smartphones, tablets, vehicles, and the like. In an embodiment, messages 17a-17n may be manually labeled by experts such that the labels describe an abnormal characteristic, which may, or may not, be a target characteristic. Messages 17A-17n may be referred to as a corpus, and further may be referred to as an original corpus for a first set of n messages, or a new, or updated, corpus after another n messages have been appended to the original, or previous updated, corpus of n messages. Continuing with discussion of FIG. 4, after a predetermined number n of messages 17 have been received and stored in table 12, message 17A-17n may be 'cleaned up', for example, by converting letters to lower case letters and removing special characters, such as '©'.

The corpus, or updated corpus, of messages 17A-17n, which my comprise cleaned up messages, is processed at step 415 according to a language model that may produce an output of n number of n-grams. The number n in 'n-gram' (not to be confused with the number n of n-grams) represents a number, or value, that may be selectable by a user or may be programmed. Because the value n in n-gram may be selectable and because an almost limitless number of n-grams may be generated from a corpus, or an updated corpus, examples of n-grams are not shown in tabular form in the figures. However, as an example, it will be appreciated that if the 'n' in the term 'n-gram' is 3, then the n-gram output from the language model may comprise 3-grams. 3-grams for a message "this is a sentence" could be 'this is a' and 'is a sentence' if the language model is configured to output word 3-grams. If the language model is configured to output character 3-grams instead of word 3-grams for "this is a sentence", for example, examples of 3-grams may be 'thi', 'his', 'is', 's i', 'is', 'is', 's a', a 'a s', and so on. The n-grams output from the language model may be referred to as analyzed corpus data.

At step 420 a characteristic test phrase may be determined, for example, by entering the characteristic test phrase into an interface provided by a computer application that may be configured to process the n-grams. The characteristic test phrase may be entered as text, by selection of an icon, by selection of an image that may be converted to text by an application that converts images into text, and the like. As an example, the characteristic test phrase, which may comprise a broad categorical characteristic, may be "laptop or system issue". At step 425 a learning model, for example a zero-shot model, which may be already trained on a language set, such as, for example, an English Wikipedia, may analyze an n-gram of the corpus data generated at step 415 relative to the characteristic test phrase selected at step 420. The learning model may provide as an output a similarity score (e.g., similarity score 22 referenced in FIG. 2) for an n-gram that corresponds to a similarity of the n-gran to the characteristic test phrase. For example, a higher output value, or similarity score, may corresponds to a greater semantic similarity to the characteristic test phrase.

Starting with the first of the n-grams generated at step 415, at step 430 a determination is made regarding the similarity of the n-gram phrase being operated on to the characteristic test phrase. If an n-gram phrase occurs at a frequency higher than a predetermined frequency threshold and is relevant to the characteristic test phrase based on the similarity score 22 indicating semantic similarity to the characteristic test phrase, then the n-gram phrase may be added at step 435 to a list, table, or other type of data structure, which may be referred to as an intermediate high similarity defined characteristic table if further consolidation is to be performed as described below, or may be stored in a high similarity defined characteristic phrases table, such as table 24 shown in FIG. 3, if no further consolidation is to be performed. As an example, a phrase "laptop crashed" is likely more relevant to the characteristic test phrase "laptop or system issue", and thus more similar thereto than the phrase "call back customer," which is likely less relevant and similar to the test phrase. The predetermined frequency threshold may be selectable and may comprise a value (determining a frequency of occurrence of an n-gram and comparing frequency to the threshold may be an embodiment that may not necessarily be implemented). For example, if an n-gram occurs only once it may be deemed as not meeting the frequency and similarity criteria at step 430 even if it has a high similarity score, whereas an n-gram that occurs five times may be deemed to meet or exceed the predetermined frequency threshold. In an example embodiment each n-gram may be compared to the phrase "laptop or system issue" semantically using a pretrained doc2vec model, which may be trained on an English Wikipedia. In an example embodiment, every n-gram, regardless of how frequently it occurs, having a semantic similarity greater than 0.7 may be determined at step 430 as being similar to the given record of the corpus being evaluated. An n-gram determined to be similar to the test phrase is added to a data set, such as n-gram database 18 described in reference to FIG. 2 at step 440 shown in FIG. 4. If a determination is made at step 440 that all n-grams generated at step 415 have not been compared with the characteristic test phrase to determine a similarity score, method 400 may advance, or increment, to the next n-gram phrase at step 445 and steps 425, 430, 435, and 440 may be repeated until all n-grams generated at step 415 have had a similarity score determined for them and the similarity scores 22 corresponding to the n-grams stored in n-gram table 18 shown in FIG. 2. When a determination is made at step 440 that all n-grams have been evaluated for similarity to a characteristic test phrase and the corresponding similarity scores have been stored, for example to n-gram table 18 shown in FIG. 2, method 400 shown in FIG. 4 advances to step 450 consolidation.

After retaining n-grams having a higher similarity score to the target than the predetermined criteria and eliminating those with a similarity score less than 0.7 (assuming 0.7 as the similarity score used at step 430), the remaining n-grams may be consolidated at step 450 by eliminating similar or common terms, such as 'laptop' or 'phone' or other words such as prepositions and articles, with the intention of leaving descriptive terms that will likely not overlap with terms in other phases that relate better, or are more similar to, a different characteristic that the defined characteristic for which similarity to textual information in messages 17 shown in FIG. 1, is being sought. For example, phrases like "dropped laptop", "crushed laptop", "broken laptop cover" may be consolidated, or reduced, at step 450 shown in FIG.

4 to "dropped", "crush", "broke", respectively. Furthermore, terms "dropped", "crush", "broke" may be combined at step 450 into a single phrase "dropped crush broke", which may be an example of a consolidated phrase in an embodiment. It will be appreciated that the consolidation step 450 may be an optional embodiment step.

At step 455, weighting factors may be calculated for each consolidated defined characteristic phrase according to the description given above in reference to FIG. 3. At step 460 shown in FIG. 4 the weighting factors calculated at step 455 may be stored to consolidated determined phrases table 24 described above in reference to FIG. 3. Method 400 ends at step 465.

Turning now to FIG. 5, the figure illustrates table 12 shown in FIG. 1 with relevance score evaluations 30 associated with respective messages 17. The score evaluation 30 may be a result of a comparison to a message's 17 corresponding relevancy score compared to a predetermined threshold.

Relevancy scores for each message 17 may be computed according to the following logic:

a. A similarity score for each determined characteristic phrase 26, or ZS phrase, shown in FIG. 3 may be calculated using a learning model, such as a zero-shot model. A similarity score for an $i^{th}$ determined characteristic phrase may be denoted by $s^i$. The learning model may be the same learning model as used to calculate similarity scores of n-grams as described above in reference to FIGS. 2, 3 and 4. However, use of the learning model to calculate the similarity scores $s^i$ is a different application of the learning model than described in reference to evaluating n-grams. In calculating the relevancy score, which may be referred to as a Z-score, the learning model may be applied to the characteristic test phrase. The learning model outputs a similarity score $s^i$ for each comparison of a determined $i^{th}$ characteristic phrase 26 to a message 17.

b. When compared with messages 17, determined characteristic phrases 26 that have a corresponding similarity score above a predetermined value, for example, 0.7, may be deemed permissible determined characteristic phrases. The threshold value of 0.7 for determining permissible characteristic phrases is given as an example and may be selectable and may differ from 0.7, as a user or business that operates depot 14 or depot 15 shown in FIG. 1, for example, may desire.

c. After calculating a similarity score for each $i^{th}$ determined characteristic phrase 26 when compared to a phrase 17, the weighting factor 28 as described in reference to FIG. 3 that corresponds to the $i^{th}$ determined characteristic phrase may be multiplied by the score $s^i$ of how similar the $i^{th}$ determined permissible characteristic phrase is to the message 17 for which a relevance score Z is being determined. The products of multiplying each $s^i$ corresponding to each $i^{th}$ permissible determined phrase by the permissible phrase's corresponding weighting factor $w^i$ for a given message 17 may be summed to result in a relevance score Z for that given message. For example for each message 17 a relevance score may be calculated for permissible phrases as $Z=\Sigma s^i * w^i$.

The Z-score may be calculated for log entry messages 17 in corpus 12 and the corpus dataset may be sorted in decreasing order of Z score in an embodiment.

In an embodiment, records 17 having a Z score above a threshold $Z^{threshold}$ may be deemed as corresponding to a determined characteristic, such as visually discernable damage. In an embodiment, 0.4 may be selected as $Z^{threshold}$. Threshold values can vary with the type of data in corpus data set 17 and can be determined with the help of inspection of message records 17 having a Z score close to the $Z^{threshold}$ value. If the determined characteristic is a first characteristic, such as visually discernable damage, items 8A-8n corresponding to messages 6A-6n, shown in FIG. 1, and respective messages 17 in table 12 may be deemed physically damaged. Users 4A-4n may be instructed where to ship, or deliver, items 8A-8n for repair. Parts needed to repair items 8A-8n may be automatically ordered for the items that correspond to message records 17 having a relevancy score higher that the Zthresholdvalue. In an embodiment, users 4A-4n corresponding to items 8A-8n for which parts are ordered may be instructed not only where to ship or deliver their respective items for repair, but may be provided a schedule for such shipping or delivery based on expected arrival of parts needed to effect repair of their respective items.

Figure 6:
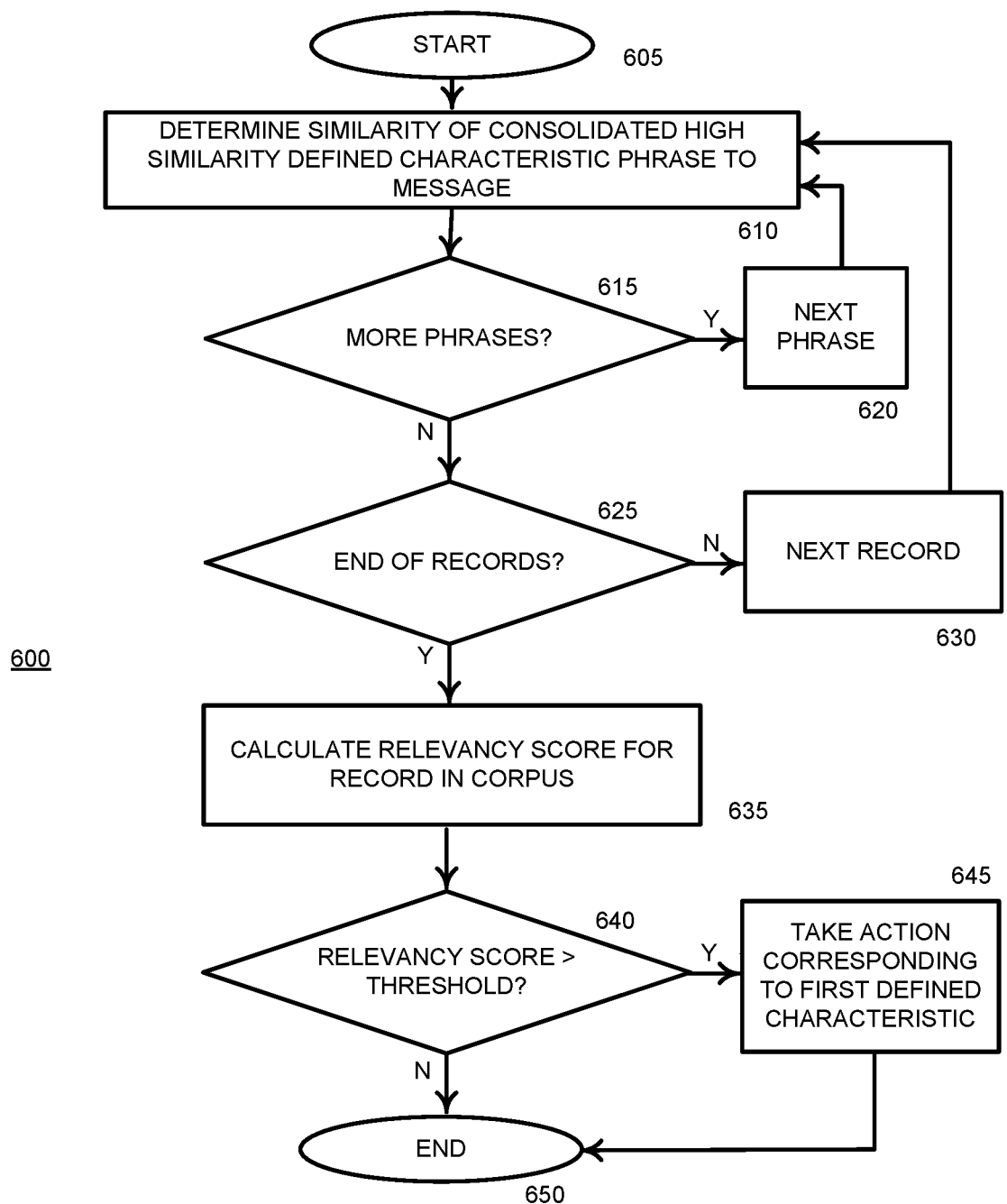
FIG. 6 illustrates an embodiment to calculate and apply relevance scores.

Turning now to FIG. 6, the figure illustrates a flow diagram of a method 600 for determining relevancy, or Z-scores, for records corresponding to item repair request messages received from user of the devices. Method 600 begins at step 605. At step 610 a determination of a consolidated high similarity determined characteristic phrase relative to a received message record, current record, or first record 16 in table 12 as shown in FIG. 1 is made. At step 615 a determination is made whether there are more consolidated high similarity defined characteristic phrases to evaluate for similarity to message 17 of the current record 16. If yes method 600 may advance to 620 and increments to the next consolidated high similarity defined characteristic phrase and steps 610 and 615 may repeat. When a determination is made at 615 that there are no more consolidated high similarity defined characteristic phrases to determine similarity for relative to the current record message 17, a determination may be made at step 625 whether all of the record messages 17 have had similarity scores determined for them for the defined characteristic phrases. If the determination made at step 625 is no, evaluation relative to messages 17 in table 12 may increment to the next record 16, which becomes the current record, which may be referred to in an embodiment as a received record, or in an embodiment as a retrieved record, and method 600 returns to step 610. If a determination is made at step 625 that all record messages 17 in table 12 have had similarity scores for consolidated high similarity defined characteristic phrases determined relative to them, a relevancy score for one or more records 17 in corpus 12 is calculated at step 635. The calculation of relevancy score, or Z-score, made at step 635 may be made as described above in reference to FIG. 5. At step 640 a determination is made whether a relevancy score for a particular record message 17 exceeds a relevancy score threshold, or $Z^{threshold}$, as described elsewhere herein. If the relevancy score for the particular current record message 17 exceeds the relevancy score threshold method 600 advances to step 645. At step 645 action may be taken corresponding to the first defined characteristic. For example, if the first define characteristic relates to visually discernible damage to a device, parts that may be needed to repair the damage may be ordered for shipment to a repair depot before the item to be repaired arrives at the repair depot. Another action that may be taken is that, depending on what characteristic a score relates to, the item may be shipped to a different repair depot than if the characteristic that the relevancy score relates to is a different characteristic. Another action that may be taken at step 645 may be determining a common problem that may indicate a defective part that may need redesigning or that may warrant a recall of all devices that were manufactured with the defective part. After action is taken at step 645 method 600 advances to step 650 and ends. If a determination is made at step 640 that a relevancy score for a particular record 17 does not exceed the relevancy score threshold, method 600 advances to step 650 and ends. Two examples are provided below to illustrate calculation and use of relevancy scores Z and are provided as non-limiting examples.

Example 1

An Input call log text message 6 may have textual information comprising: "Commercial Chrome CHROMEBOOK 11 3189 CHAT RTD Broken LCD screen and Hinge This device was dropped and the screen is cracked and the hinges don't work as they should. Id like to use my accidental damage claim and send it to the depot for complete repair Other Issues CHAT RTD Broken LCD screen and Hinge." This message 6 may become a message 17 in table 12 shown in FIG. 1.

Permissible ZS phrases may be determined as having Similarity Score>0.7: Each ZS phrase is compared with call log text using a zero-shot learning model. Phrases having Similarity score $s^i$>0.7 are deemed permissible ZS phrases.

TABLE 1

| Permissible ZS phrases | Similarity Score (si) to call log >0.7 |
| --- | --- |
| broken screen | 0.997 |
| accidental damage | 0.995 |
| broken hinge | 0.995 |
| physically damaged laptop | 0.987 |
| crushed drop broke | 0.964 |

Weighting factor $w^i$ for each phrase

TABLE 2

| Permissible ZS phrases | Similarity Score(si)with call log | Weighting factor $w^i$ |
| --- | --- | --- |
| broken screen | 0.997 | 0.500 |
| accidental damage | 0.995 | 1.000 |
| broken hinge | 0.995 | 1.000 |
| physically damaged laptop | 0.987 | 0.500 |
| crushed drop broke | 0.964 | 1.000 |

Calculation of Z-score
0.997*0.5+0.995*1+0.995*1+0.987*0.5+0.964*1=3.946
$Z^{threshold}$=0.4
ZS Phrase relevance score (Z)=3.946
Z score exceeds $Z^{threshold}$ indicating Physical Damage.

Example 2

An Input call log text message 6 may have textual information comprising: "problem details: laptop will not power on. Tried different charger, battery and no power at all from laptop. service location: address line 1: 3521 gabel rd city: billings state/province: mt country: us zip/postal code: 59102 windows windows 10." This message 6 may become a message 17 in table 12 shown in FIG. 1.

Permissible ZS phrases may be determined as having Similarity Score>0.7: Each ZS phrase is compared with call log text using a zero-shot learning model. Phrases having Similarity score $s^i$>0.7 are deemed permissible ZS phrases.

TABLE 3

| Permissible ZS phrases | Similarity Score(si)with call log |
| --- | --- |
| does not turn on | 0.998 |
| no power | 0.996 |
| not charging | 0.996 |
| laptop crashing | 0.988 |
| no boot | 0.983 |

Weighting factor $w^i$ for each phrase

TABLE 4

| Permissible ZS phrases | Similarity Score(si)with call log | Weighting factor $w^i$ |
| --- | --- | --- |
| does not turn on | 0.998 | −1.00 |
| no power | 0.996 | −1.00 |
| not charging | 0.996 | −1.00 |
| laptop crashing | 0.988 | 0.00 |
| no boot | 0.983 | −1.00 |

Calculation of Z
0.998*−1+0.996*−1+0.996*−1+0.988*0+0.983*−1=−3.973
$Z^{threshold}$=0.4
ZS Phrase relevance score(Z)=−3.973
Z score of −3.973 is lower than $Z^{threshold}$ indicating no physical damage.

Figure 7:
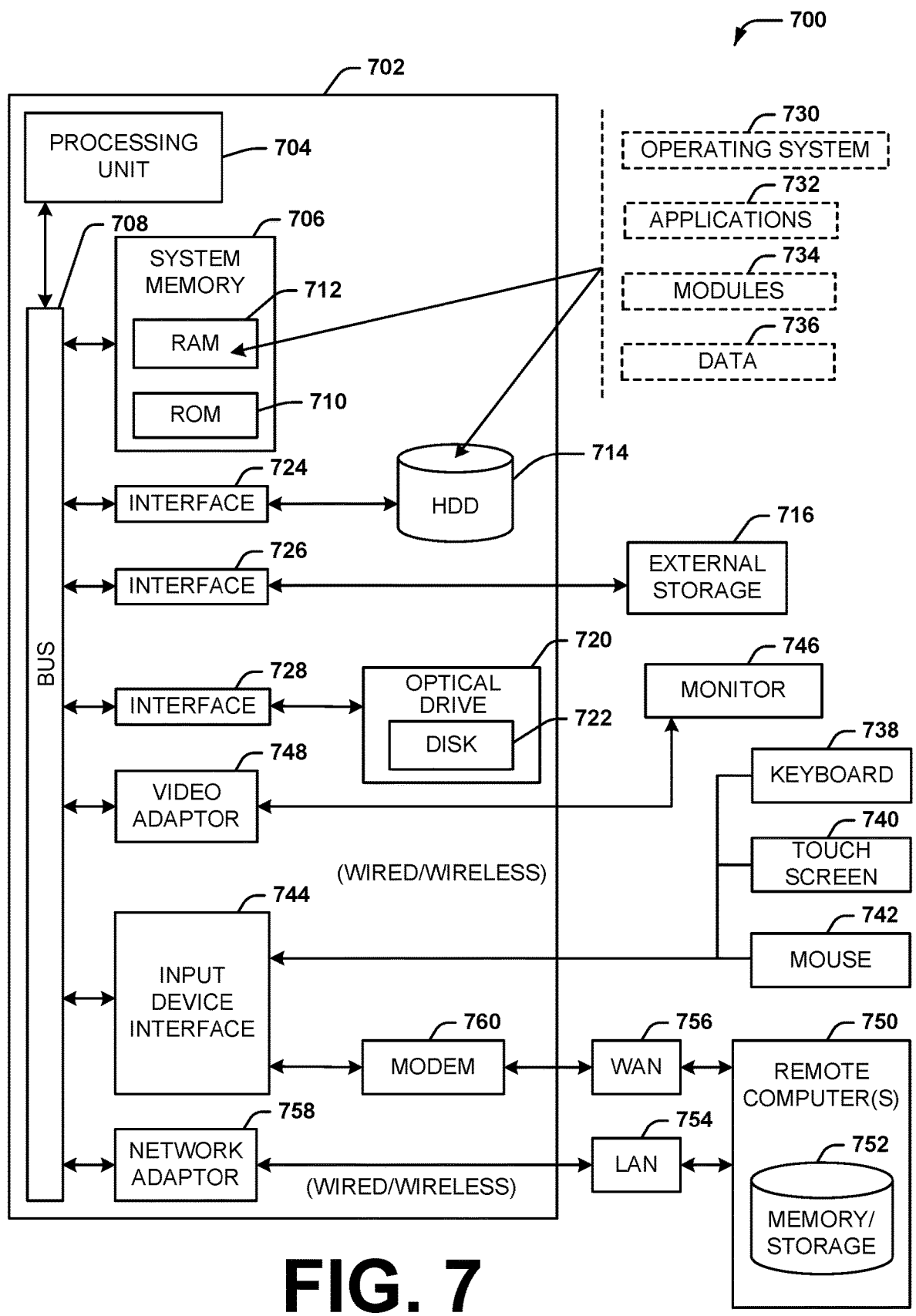
FIG. 7 illustrates a computer environment.

In order to provide additional context for various embodiments described herein, FIG. 7 and the following discussion are intended to provide a brief, general description of a suitable computing environment 700 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 7, the example environment 700 for implementing various embodiments of the aspects described herein includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors and may include a cache memory. Dual microprocessors and other multi-processor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 includes ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 612 can also include a high-speed RAM such as static RAM for caching data.

Computer 702 further includes an internal hard disk drive (HDD) 714 (e.g., EIDE, SATA), one or more external storage devices 716 (e.g., a magnetic floppy disk drive (FDD) 716, a memory stick or flash drive reader, a memory card reader, etc.) and an optical disk drive 720 (e.g., which can read or write from a CD-ROM disc, a DVD, a BD, etc.). While the internal HDD 714 is illustrated as located within the computer 702, the internal HDD 714 can also be configured for external use in a suitable chassis (not shown). Additionally, while not shown in environment 700, a solid-state drive (SSD) could be used in addition to, or in place of, an HDD 714. The HDD 714, external storage device(s) 716 and optical disk drive 720 can be connected to the system bus 708 by an HDD interface 724, an external storage interface 726 and an optical drive interface 728, respectively. The interface 724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 712, including an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

Computer 702 can optionally comprise emulation technologies. For example, a hypervisor (not shown) or other intermediary can emulate a hardware environment for operating system 730, and the emulated hardware can optionally be different from the hardware illustrated in FIG. 7. In such an embodiment, operating system 730 can comprise one virtual machine (VM) of multiple VMs hosted at computer 702. Furthermore, operating system 730 can provide runtime environments, such as the Java runtime environment or the .NET framework, for applications 732. Runtime environments are consistent execution environments that allow applications 732 to run on any operating system that includes the runtime environment. Similarly, operating system 730 can support containers, and applications 732 can be in the form of containers, which are lightweight, standalone, executable packages of software that include, e.g., code, runtime, system tools, system libraries and settings for an application.

Further, computer 702 can comprise a security module, such as a trusted processing module (TPM). For instance with a TPM, boot components hash next in time boot components, and wait for a match of results to secured values, before loading a next boot component. This process can take place at any layer in the code execution stack of computer 602, e.g., applied at the application execution level or at the operating system (OS) kernel level, thereby enabling security at any level of code execution.

A user can enter commands and information into the computer 702 through one or more wired/wireless input devices, e.g., a keyboard 738, a touch screen 740, and a pointing device, such as a mouse 742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 704 through an input device interface 744 that can be coupled to the system bus 708, but can be connected by other interfaces, such as a parallel port, an IEEE 1394 serial port, a game port, a USB port, an IR interface, a BLUETOOTH® interface, etc.

A monitor 746 or other type of display device can be also connected to the system bus 608 via an interface, such as a video adapter 748. In addition to the monitor 746, a computer typically includes other peripheral output devices (not shown), such as speakers, printers, etc.

The computer 702 can operate in a networked environment using logical connections via wired and/or wireless communications to one or more remote computers, such as a remote computer(s) 750. The remote computer(s) 750 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 752 is illustrated. The logical connections depicted include wired/wireless connectivity to a local area network (LAN) 754 and/or larger networks, e.g., a wide area network (WAN) 756. Such LAN and WAN networking environments are commonplace in offices and companies, and facilitate enterprise-wide computer networks, such as intranets, all of which can connect to a global communications network, e.g., the internet.

When used in a LAN networking environment, the computer 702 can be connected to the local network 754 through a wired and/or wireless communication network interface or adapter 758. The adapter 758 can facilitate wired or wireless communication to the LAN 754, which can also include a wireless access point (AP) disposed thereon for communicating with the adapter 758 in a wireless mode.

When used in a WAN networking environment, the computer 702 can include a modem 660 or can be connected to a communications server on the WAN 756 via other means for establishing communications over the WAN 756, such as by way of the internet. The modem 760, which can be internal or external and a wired or wireless device, can be connected to the system bus 708 via the input device interface 744. In a networked environment, program modules depicted relative to the computer 702 or portions thereof, can be stored in the remote memory/storage device 752. It will be appreciated that the network connections shown are example and other means of establishing a communications link between the computers can be used.

When used in either a LAN or WAN networking environment, the computer 702 can access cloud storage systems or other network-based storage systems in addition to, or in place of, external storage devices 716 as described above. Generally, a connection between the computer 702 and a cloud storage system can be established over a LAN 754 or WAN 756 e.g., by the adapter 758 or modem 760, respectively. Upon connecting the computer 702 to an associated cloud storage system, the external storage interface 726 can, with the aid of the adapter 758 and/or modem 760, manage storage provided by the cloud storage system as it would other types of external storage. For instance, the external storage interface 726 can be configured to provide access to cloud storage sources as if those sources were physically connected to the computer 702.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 8:
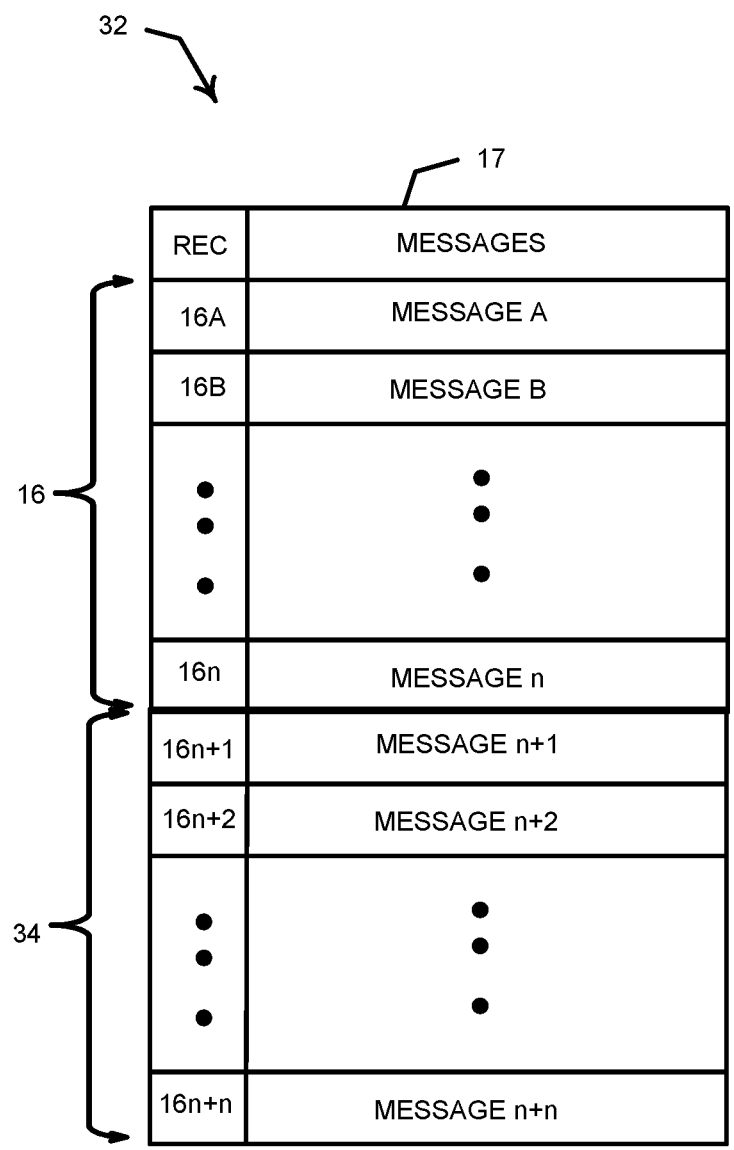
FIG. 8 illustrates an embodiment of updated corpus of messages.

Turning now to FIG. 8, the figure illustrates a records corpus 32 that may comprise an original corpus or records, such as records 17a-17n shown in table 12 of FIG. 1, and another n number of records 34. New records that made up records 34 are enumerated as $16_{n+1}$-$16_{n+n}$ to show that new message records may be appended to an existing corpus, which may be referred to as a current corpus. When new records have been appended to an existing corpus of records, the new corpus that comprises the previous existing corpus and the new records may be referred to as a current corpus. FIG. 8 illustrates an embodiment in which a number of n messages 6, as shown in FIG. 1, may be received from users 4 during a defined period, for example one day. The n messages received in the defined period may be a corpus 12 referred to in FIG. 1, and the calibration procedures disclosed herein (e.g., calibration may refer to determining defined characteristic phrases, or ZS phrases from n-grams, consolidating the defined characteristic phrases, and determining and assigning weighting factors to the defined characteristic phrases) may be performed on an original corpus of n message records, and later the calibration procedures may be performed on n+n records as a new, or updated, corpus of record message, and later the calibration procedures may be performed on n+n+n record messages as a new, or updated, corpus or message records, and so on. Thus, defined characteristic phrases and associated respective weighting factors may change as the updated corpus of message records grows with more and more records. It will be appreciated that the terms database or table may be used herein to refer to data structures 12, 18, 24, 34, and that these tables are shown in the figures as cellular tables for purposes of illustration, but these terms and illustrations may be implemented in other data structure forms, such as comma separated value, relational databases, tables, a spreadsheet (that may or may not have formulas in the cells therefor to perform computations, such as weighting factors or Z-scores, for example), a distributed data store, or other structures or storage device for storing information and data.

Turning now to FIG. 9, the figure illustrates a diagram of an example embodiment method 900.

Method example embodiment 900 comprises receiving, by a system comprising a processor, an electronic current message that comprises textual information at block 905. At block 910 the method embodiment comprises analyzing the textual information in the electronic current message to produce, without human intervention, one or more current similarity scores that correspond to respective one or more defined phrases, wherein at least one of the one or more defined phrases relates to a first defined characteristics, and wherein the one or more defined phrases are associated with respective one or more weighting factors.

At block 915 in response to a current similarity score of the one or more defined phrases being determined to satisfy a defined similarity threshold, the embodiment may comprise determining a defined phrase of the one or more defined phrases as corresponding to the textual information.

At block 920 the method embodiment may comprise determining a relevance score comprising combining the one or more current similarity scores and the respective one or more weighting factors for any of the respective one or more defined phrases for which a respective current similarity score satisfies the defined similarity threshold.

At block 925 the method embodiment may comprise comparing the relevance score to a defined relevance score threshold that corresponds to the first defined characteristic.

At block 930 the method embodiment may comprise in response to the relevance score being determined to exceed the defined relevance score threshold based on a result of the comparing, determining that at least some of the textual information of the electronic current message describes the first defined characteristic.

Figure 10A:
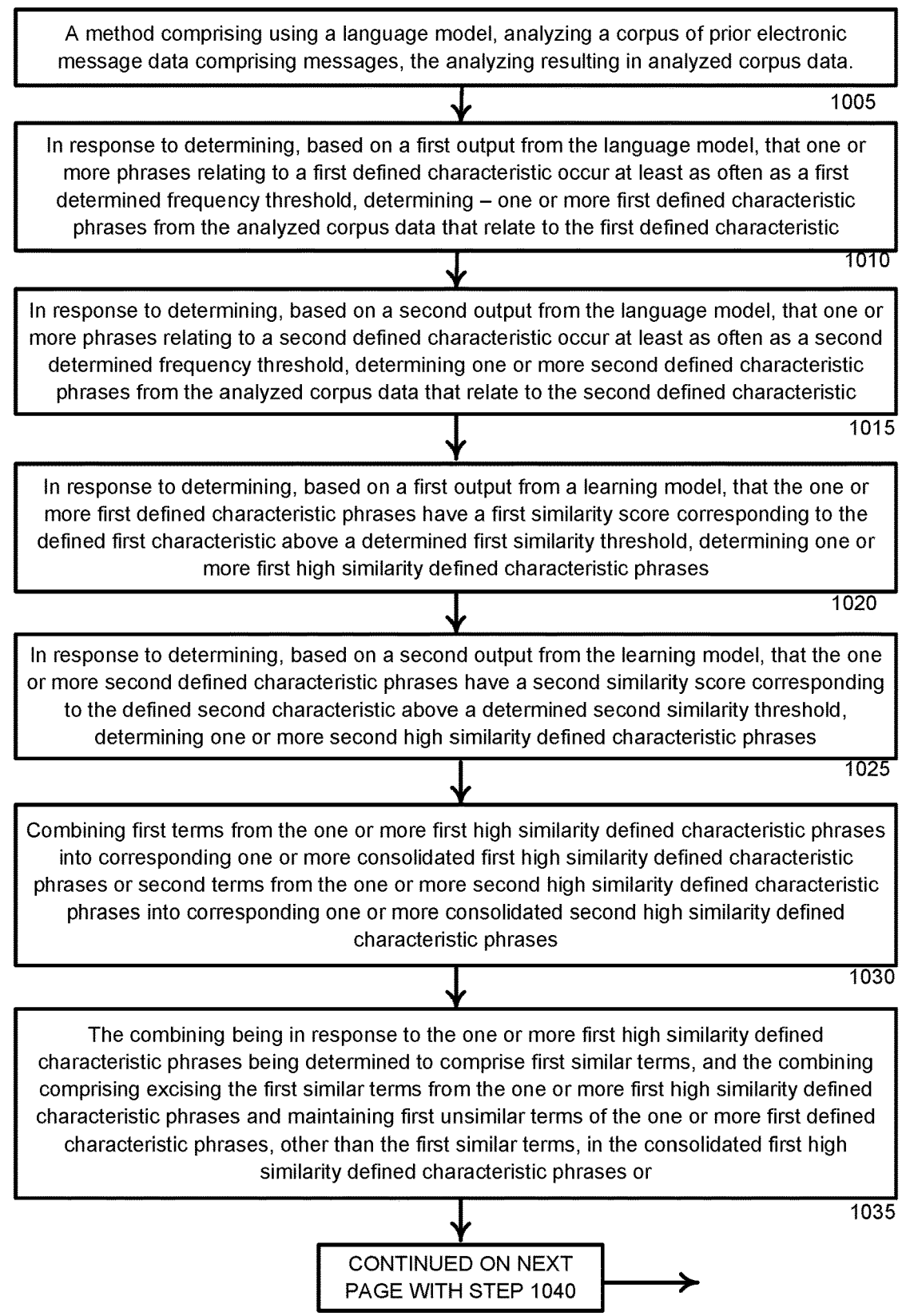
FIG. 10A illustrates a method embodiment to calculate and apply relevance scores.

Turning now to FIG. 10A the figure illustrates an example embodiment method 1000 comprising at block 1005 using a language model, analyzing a corpus of prior electronic message data comprising messages, the analyzing resulting in analyzed corpus data.

At block 1010 in response to determining, based on a first output from the language model, that one or more phrases relating to a first defined characteristic occur at least as often as a first determined frequency threshold, determining—one or more first defined characteristic phrases from the analyzed corpus data that relate to the first defined characteristic.

At block 1015 in response to determining, based on a second output from the language model, that one or more phrases relating to a second defined characteristic occur at least as often as a second determined frequency threshold, determining one or more second defined characteristic phrases from the analyzed corpus data that relate to the second defined characteristic.

At block 1020 in response to determining, based on a first output from a learning model, that the one or more first defined characteristic phrases have a first similarity score corresponding to the defined first characteristic above a determined first similarity threshold, determining one or more first high similarity defined characteristic phrases.

At block 1025 in response to determining, based on a second output from the learning model, that the one or more second defined characteristic phrases have a second similarity score corresponding to the defined second characteristic above a determined second similarity threshold, determining one or more second high similarity defined characteristic phrases.

At block 1030 combining first terms from the one or more first high similarity defined characteristic phrases into corresponding one or more consolidated first high similarity defined characteristic phrases or second terms from the one or more second high similarity defined characteristic phrases into corresponding one or more consolidated second high similarity defined characteristic phrases, the combining being at block 1035 in response to the one or more first high similarity defined characteristic phrases being determined to comprise first similar terms, and the combining comprising excising the first similar terms from the one or more first high similarity defined characteristic phrases and maintaining first unsimilar terms of the one or more first defined characteristic phrases, other than the first similar terms, in the consolidated first high similarity defined characteristic phrases or, turning to FIG. 10B, at block 1040 in response to the one or more second high similarity defined characteristic phrases being determined to comprise second similar terms, and the combining comprising excising the second similar terms from the one or more second high similarity defined characteristic phrases and maintaining second unsimilar terms of the one or more second high similarity defined characteristic phrases, other than the second similar terms, in the consolidated second high similarity defined characteristic phrases.

At block 1045 associating respective first weighting factors with the consolidated first high similarity defined characteristic phrases or second weighting factors with the second high similarity defined characteristic phrases based on a first count of messages of the corpus of prior electronic message data that contain the consolidated first or second defined characteristic phrases that meet a similarity criterion as determined by the learning model and based on a second count of the first count of messages that have been previously determined to relate to the first defined characteristic, wherein at block 1050 at least one of the consolidated first high similarity defined characteristic phrases or the second high similarity defined characteristic phrases is used to at block 1055 analyze textual information in a received electronic current message to produce, without human intervention, current similarity scores that correspond to the one or more of the consolidated first defined characteristic phrases or the second defined characteristic phrases.

At block 1060 based on the current similarity scores being determined to satisfy a similarity threshold, determine that the consolidated first defined characteristic phrases or the second defined characteristic phrases correspond to the textual information.

At block 1065 based on the consolidated first defined characteristic phrases or the second defined characteristic phrases having been determined to correspond to the textual information, combine the current similarity scores and the respective first weighting factors for the consolidated first highly similar defined characteristic phrase or the respective second weighting factors for the consolidated second highly similar defined characteristic phrase, to produce a relevance score.

At block 1070 based on a result of comparing the relevance score to a relevance score threshold that corresponds to the first defined characteristic indicating that the relevance score exceeds the relevance score threshold, deem the received electronic current message as containing textual information that indicates the first defined characteristic.

The following Table 5 may be helpful in reading the description herein, but is not provided as, or meant to be, a limiting glossary.

TABLE 5

| Term | Definition |
|---|---|
| zero-shot learning model | A learning model that is pre trained and does not require training data |
| ZS Phrases | Select phrases denoting common characteristics, such as visual observations of damage, that are generated by doing an n-gram analysis of sample data records, or logs |
| Weighting Factor(w) | A weighting factor for any ZS phrase indicates how strongly the phrase relates to key characteristics, such as visual observations (damage, fraud, or other abnormalities) |

TABLE 5-continued

| Term | Definition |
|---|---|
| Permissible ZS Phrases (P) | Each ZS phrase is compared with log text using a zero shot model and those phrases having a Similarity score (si) > pre-defined threshold are called Permissible ZS Phrases (P) |
| ZS Phrase relevance score (Z) | ZS Phrase relevance score is final score calculated as the sum product of similarity of each Permissible ZS phrase with the text entry and Weighting Factor (W) of each ZS phrase across all ZS phrases |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

Method steps may be embodied in computer software, firmware, or hardware, and may be implemented by computer code stored on computer readable media.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time, priority, sequence of operation, or preference. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by a system comprising a processor, an electronic current message that comprises textual information;
analyzing the textual information in the electronic current message to produce, without human intervention, one or more current similarity scores that correspond to respective one or more defined phrases, wherein at least one of the one or more defined phrases relates to a first defined characteristics, and wherein the one or more defined phrases are associated with respective one or more weighting factors;
in response to a current similarity score of the one or more defined phrases being determined to satisfy a defined similarity threshold, determining a defined phrase of the one or more defined phrases as corresponding to the textual information;
determining a relevance score comprising combining the one or more current similarity scores and the respective one or more weighting factors for any of the respective one or more defined phrases for which a respective current similarity score satisfies the defined similarity threshold;
comparing the relevance score to a defined relevance score threshold that corresponds to the first defined characteristic; and
in response to the relevance score being determined to exceed the defined relevance score threshold based on a result of the comparing, determining that at least some of the textual information of the electronic current message describes the first defined characteristic.

2. The method of claim 1, wherein at least one of the one or more defined phrases relates to a second defined characteristic that is different from the first defined characteristic.

3. The method of claim 1, wherein the analyzing of the textual information in the electronic current message is performed according to a zero-shot model.

4. The method of claim 1, wherein a phrase is determined to be one of the one or more defined phrases based on a prior similarity score being associated with the phrase before the receiving of the electronic current message.

5. The method of claim 4, wherein the prior similarity score is determined from one or more electronic prior messages that have been deemed by human intervention to contain textual information that pertains to the first defined characteristic.

6. The method of claim 2, wherein the first defined characteristic pertains to visually perceptible physical damage that is able to occur to an item, wherein the second defined characteristic pertains to a functionality problem that is able to occur with the item, and wherein the textual information of the electronic current message comprises a customer complaint corresponding to an item.

7. The method of claim 1, wherein the textual information of the electronic current message comprises a customer complaint related to an item associated with a customer identity of a customer, and further comprising:
   directing, via an electronic authorization message without human intervention during an online electronic communication message, a communication to a device associated with the customer identity of the customer to provide the item, to which the customer complaint corresponds, to a repair facility specified in the electronic authorization message that is equipped to repair items that exhibit the first defined characteristic.

8. The method of claim 2, wherein the electronic current message is one of a plurality of electronic messages from which a determination of the one or more defined phrases that relate to the first defined characteristic or second defined characteristic and the respective one or more weighting factors that correspond thereto is made.

9. A system, comprising:
   a processor, coupled to a memory storing instructions, that, in response to execution, cause the system to:
   receive an electronic current message that comprises textual information;
   analyze the textual information in the electronic current message to produce, without human intervention, one or more current similarity scores that correspond to respective one or more defined phrases, wherein at least one of the one or more defined phrases relates to a first defined characteristic, and wherein the one or more defined phrases are associated with respective one or more weighting factors;
   determine the one or more defined phrases as corresponding to the textual information responsive to the one or more current similarity scores of the one or more defined phrases being determined to satisfy a specified similarity threshold;
   combine the one or more current similarity scores and the respective one or more weighting factors for which the one or more current similarity scores were determined to satisfy the specified similarity threshold to produce a relevance score;
   compare the relevance score to a specified relevance score threshold that corresponds to the first defined characteristic, resulting in a comparison result; and
   categorize the textual information of the electronic current message as comprising information that has the first defined characteristic in response to the comparison result indicating that the relevance score exceeds the specified relevance score threshold.

10. The system of claim 9, wherein at least one of the one or more defined phrases relates to a second defined characteristic that is different from the first defined characteristic.

11. The system of claim 9, wherein the analyzing of the textual information in the electronic current message is performed according to a zero-shot model.

12. The system of claim 9, wherein a phrase is determined to be a defined phrase of the one or more defined phrases based on a prior similarity score being associated with the defined phrase before the receiving of the electronic current message.

13. The system of claim 12, wherein the prior similarity score is determined from a group of electronic prior messages that have been deemed by human intervention to contain the information that pertains to the first characteristic.

14. The system of claim 10, wherein the first defined characteristic pertains to visually perceptible physical damage to an item, wherein the second defined characteristic pertains to a functionality of the item, and wherein the electronic current message comprises a customer complaint regarding the item.

15. A method, comprising:
   using a language model, analyzing a corpus of prior electronic message data comprising messages, the analyzing resulting in analyzed corpus data;
   in response to determining, based on a first output from the language model, that one or more phrases relating to a first defined characteristic occur at least as often as a first determined frequency threshold, determining one or more first defined characteristic phrases from the analyzed corpus data that relate to the first defined characteristic;
   in response to determining, based on a second output from the language model, that one or more phrases relating to a second defined characteristic occur at least as often as a second determined frequency threshold, determining one or more second defined characteristic phrases from the analyzed corpus data that relate to the second defined characteristic;
   in response to determining, based on a first output from a learning model, that the one or more first defined characteristic phrases have a first similarity score corresponding to the defined first characteristic above a determined first similarity threshold, determining one or more first high similarity defined characteristic phrases;
   in response to determining, based on a second output from the learning model, that the one or more second defined characteristic phrases have a second similarity score corresponding to the defined second characteristic above a determined second similarity threshold, determining one or more second high similarity defined characteristic phrases;
   combining first terms from the one or more first high similarity defined characteristic phrases into corresponding one or more consolidated first high similarity defined characteristic phrases or second terms from the one or more second high similarity defined characteristic phrases into corresponding one or more consolidated second high similarity defined characteristic phrases, the combining being:
      in response to the one or more first high similarity defined characteristic phrases being determined to comprise first similar terms, and the combining comprising excising the first similar terms from the one or more first high similarity defined characteristic phrases and maintaining first unsimilar terms of the one or more first defined characteristic phrases, other than the first similar terms, in the consolidated first high similarity defined characteristic phrases, or in response to the one or more second high similarity defined characteristic phrases being determined to comprise second similar terms, and the combining comprising excising the second similar terms from the one or more second high similarity defined characteristic phrases and maintaining second unsimilar terms of the one or more second high similarity defined characteristic phrases, other than the second similar terms, in the consolidated second high similarity defined characteristic phrase;

associating respective first weighting factors with the consolidated first high similarity defined characteristic phrases or second weighting factors with the second high similarity defined characteristic phrases based on a first count of messages of the corpus of prior electronic message data that contain the consolidated first or second defined characteristic phrases that meet a similarity criterion as determined by the learning model and based on a second count of the first count of messages that have been previously determined to relate to the first defined characteristic, wherein at least one of the consolidated first high similarity defined characteristic phrases or the second high similarity defined characteristic phrases is used to:

analyze textual information in a received electronic current message to produce, without human intervention, current similarity scores that correspond to the one or more of the consolidated first defined characteristic phrases or the second defined characteristic phrases;

based on the current similarity scores being determined to satisfy a similarity threshold, determine that the consolidated first defined characteristic phrases or the second defined characteristic phrases correspond to the textual information;

based on the consolidated first defined characteristic phrases or the second defined characteristic phrases having been determined to correspond to the textual information, combine the current similarity scores and the respective first weighting factors for the consolidated first highly similar defined characteristic phrase or the respective second weighting factors for the consolidated second highly similar defined characteristic phrase, to produce a relevance score; and based on a result of comparing the relevance score to a relevance score threshold that corresponds to the first defined characteristic indicating that the relevance score exceeds the relevance score threshold, deem the received electronic current message as containing textual information that indicates the first defined characteristic.

16. The method of claim 15, wherein a given weighting factor for a consolidated first or second determined characteristic phrase is based on the second count of messages divided by the first count of messages.

17. The method of claim 15, wherein the relevance score is based on a summation of respective products of the current similarity scores and the respective first weighting factors or second weighting factors having a current similarity score of the one or more defined phrases that meet the determined similarity threshold.

18. The method of claim 15, wherein the language model is an n-gram model and the learning model is a zero-shot learning model.

19. The method of claim 15, wherein the received electronic current message is a message of the corpus of prior electronic message data.

20. The method of claim 15, wherein the method is performed multiple times, wherein, for a first time of the multiple times, the corpus is an original corpus of prior electronic message data messages, and, for one or more subsequent times of the multiple times subsequent to the first time, the corpus is changed to a subsequent corpus of prior electronic message data messages that comprises the original corpus of prior electronic message data messages.

* * * * *